Patented Oct. 31, 1939

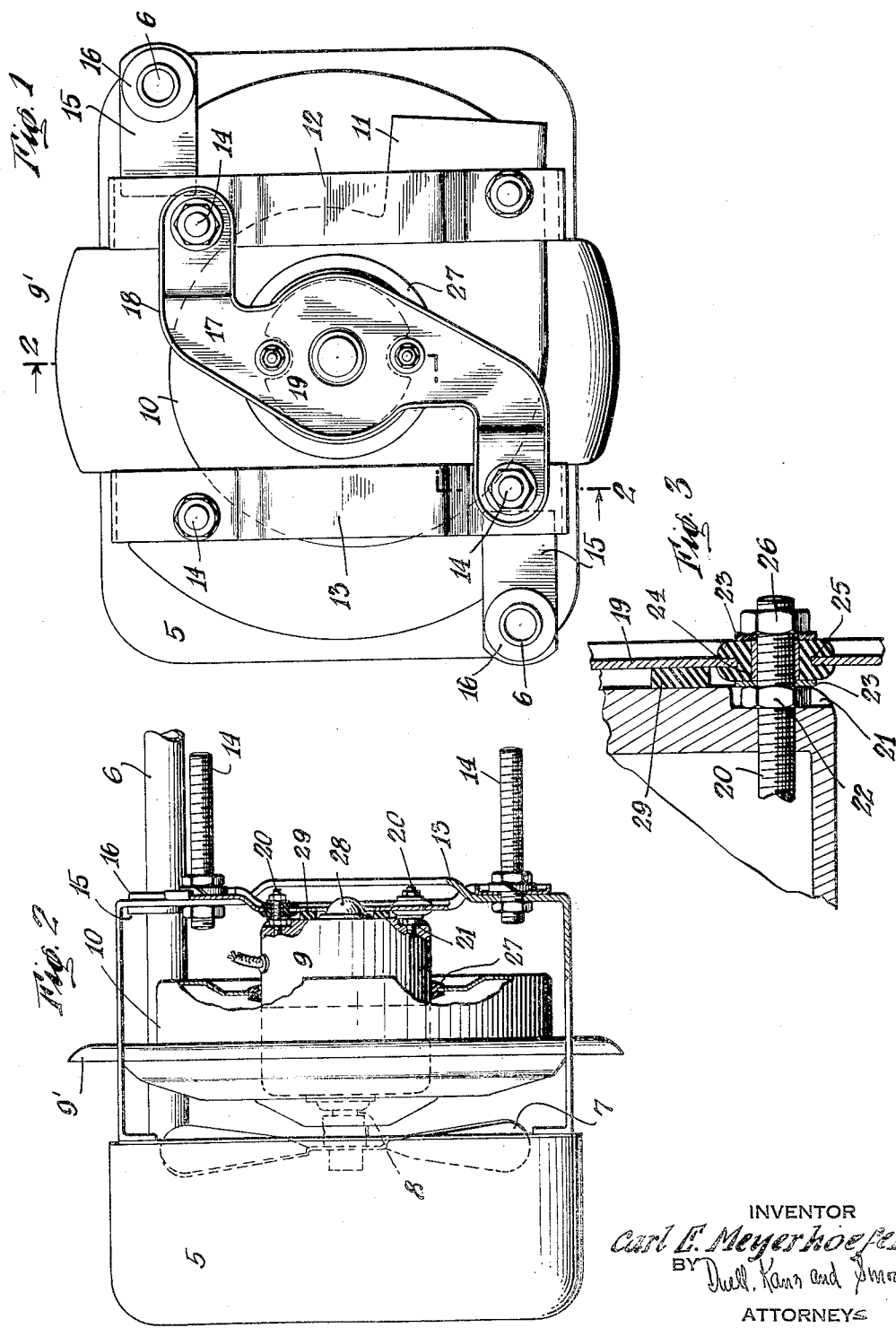

2,178,401

UNITED STATES PATENT OFFICE 2,178,401

MOTOR MOUNTING

Carl E. Meyerhoefer, Brooklyn, N. Y., assignor to E. A. Laboratories, Inc., Brooklyn, N. Y., a corporation of New York Application July 17, 1937, Serial No. 154,148

4 Claims. (Cl. 248—26)

This invention relates to a motor mounting, and, in its more specific aspects, aims to provide a functionally and structurally improved mounting, capable of use in numerous different associations, but primarily intended for the support of small motors such as are employed to drive air-impelling units.

It is an object of the invention to furnish a structure of this character, and by means of which a motor will be mounted in such a manner that shocks will not be transmitted to it. In other words, if the unit is installed in a vehicle, such unit will be guarded to the greatest extent against detrimental vibrations, jars, and other factors which might otherwise materially shorten its life.

A further object of the invention is that of furnishing a mounting such that motor noises and vibrations will not be translated into objectionable sound-waves on the part of the main structure supporting such motor.

An additional object is that of providing a mounting embodying relatively few and individually simple and rugged parts, which parts may readily be manufactured by automatic machinery and processes, and which may, moreover, be assembled with facility to furnish a unitary structure operating over long periods of time with freedom from all difficulties.

With these and other objects in mind, reference is had to the attached sheet of drawings illustrating one practical embodiment of the invention, and in which:

Fig. 1 is a rear view of a structure with which a mounting of the present type is associated;

Fig. 2 is a sectional view taken substantially along the lines 2—2 and in the direction of the arrows as indicated in Fig. 1; and Fig. 3 is an enlarged fragmentary sectional view showing one of the details of the mounting.

In these several views, a preferred use of the invention has been illustrated. This includes the employment of a motor driven fan and/or other air-impeller in association with a heat-exchange device, and in which the problem as heretofore existing in connection with a motor mounting is solved. It will be understood, however, that the present invention might be utilized in numerous other specific associations, and to this end the drawing and specification are to be regarded as illustrative rather than in a limiting sense, except where otherwise indicated in the appended claims.

Thus, the numeral 5 indicates a casing enclosing a heat-exchange core (not shown), coupled to a source of fluid by tubes 6. As shown, a fan 7 may be secured to the shaft 8, of a motor 9, and this fan may serve to draw air through the heat-exchange device and direct such air towards a deflecting ring 9'. The motor may also serve to drive a blower wheel (also not shown), disposed within a casing 10, and which is provided with a tangentially extending tube 11.

It will be appreciated by those skilled in the art, that the blower wheel serves, under operating conditions, to cause an air-flow through duct 11, and which may be employed to cool or heat relatively remote portions of an enclosure, such as the tonneau of a motor vehicle, or the windshield thereof.

The housing 5, tubes 6, and plate 9', are supported by a bracket preferably including spaced strap portions 12 and 13. From these extend mounting bolts 14, which may, for example, pass through the dash of a vehicle or other supporting surface, for the purpose of retaining the assembly in position.

Supports 15 may be secured to straps 12 and 13 by welding or otherwise, and are provided with openings through which the tubes 6 pass. Grommets 16, of rubber or other material, may encircle tubes 6 at the point at which they pass through the openings of the supports, to thus guard against vibration being transmitted to the mounting straps 12 and 13, and also to cushion the tubes against shock.

Secured to straps 12 and 13, as, for example, by certain of the bolts 14, are the ends of a bracket 17. This bracket may embrace any desired configuration, but preferably, in an installation of this nature, is of general S-shape. A flange 18 may be furnished adjacent its edges for the purpose of rigidifying the bracket, and while the central portions of straps 12 and 13 are preferably extended away from and to the rear of motor casing 9, the central portion of this bracket is preferably extended inwardly towards housing 5, as is especially shown in Fig. 2. The bracket may be enlarged to provide a central portion 19 approximating in area the rear face of the motor casing 9. In accordance with more or less conventional construction, the motor casing may be formed by a plurality of sections maintained in assembled condition by bolts 20 extending therethrough. In line with these bolts, recesses 21 may be formed in the motor casing, and these receive clamping nuts 22. Also, in line with the bolts, the central portion 19 of the bracket is formed with openings through which the bolt ends extend. Encircling each of the bolts adjacent these points are washers 23, spacing bushings 24, and grommets 25, of rubber or similar material, which encircle the bushings and straddle the edges of opening in bracket portion 19. Nuts 26 are mounted adjacent the outer ends of the bolts, and are tightened so as to maintain the parts of the assembly into intimate contact with each other.

It is accordingly obvious that with the heater in mounted position, the rearwardly extending portion of the straps 12 and 13 will bear against the mounting surface to provide for proper stability. The end of bracket 17 will be clamped, for example, by the same assembly which secures the strap portion against movement, and, due to the rigidity of this bracket, no appreciable movement of the same with respect to the remaining portions will occur.

The motor will be anti-vibrationally supported, and no noise will be transmitted by such motor to the mounting parts. At the same time, it will be understood that the nature of this support is such that the motor will remain in proper position regardless of severe usage to which it may be subjected. To this end, and as suggested in Fig. 2, there may be interposed between the edge of the casing 10 and the exterior surface of the rearward casing section of the motor, a rubber gasket or similar element 27. This expedient will obviously additionally brace the parts and further prevent against transmission of noises.

From the foregoing, it will be appreciated that a structure is furnished which will cushion the motor against shocks occurring substantially in a vertical plane as viewed in Figs. 1 and 2. In order to cushion the motor laterally, yielding material, such as rubber, is disposed between the central portion of the bracket and interposed between the adjacent faces of this portion and the motor casing. In this manner, lateral stability is provided for. While such a layer may take numerous different forms, it is preferred that it be in the nature of a ring 29, the central portion of which accommodates the rear projecting portion 28 of the motor casing. Also, at diametrically opposite points, this ring should be notched, so that the bolts 20 and parts associated therewith will not contact the ring.

From the foregoing, it will be appreciated that, among others, the several objects of the invention, as specifically aforenoted, are achieved. Obviously, numerous changes in construction and rearrangement of the parts might be resorted to without departing from the spirit of the invention as defined by the claims.

Having thus fully described the invention, what is claimed is:

1. A mounting including, in combination, a motor embracing a multiple casing section, bolts for drawing the sections of said casing into intimate contact with each other, said bolts extending beyond one of the ends of said casing, a bracket formed with openings to accommodate said projecting bolt ends, grommets engaging said bracket adjacent said openings, means for drawing said grommets and bracket towards the end section of said casing, and a ring of resilient material interposed between the end section of the casing and the inner face of said bracket.

2. A mounting including, in combination, a motor embracing a multiple casing section, bolts for drawing the sections of said casing into intimate contact with each other, said bolts extending beyond one of the ends of said casing, a bracket formed with openings to accommodate said projecting bolt ends, grommets engaging said bracket adjacent said openings, means for drawing said grommets and bracket towards the end section of said casing, and a ring of resilient material interposed between the end section of the casing and the inner face of said bracket, said ring being formed with notches to accommodate said bolts and grommets.

3. A motor mounting, including, in combination, a motor casing, a pair of bolts extending rearwardly therefrom and at substantially diametrically opposite points beyond the center of such casing, a mounting member formed with openings spaced a distance corresponding to the spacing of such bolts, and through which openings said bolts extend, resilient elements encircling said bolts and engaging the edges of the openings formed in said mounting member to yieldingly support said casing, a layer of yieldable material interposed between said member and casing and extending between said bolts and means carried by said bolts to draw said casing towards said member and to compress said layer.

4. A motor mounting, including, in combination, a motor casing, a pair of bolts extending rearwardly therefrom and at substantially diametrically opposite points beyond the center of such casing, a mounting member formed with openings spaced a distance corresponding to the spacing of such bolts, and through which openings said bolts extend, resilient elements encircling said bolts and engaging the edges of the openings formed in said mounting member to yieldingly support said casing, a layer of yieldable material interposed between said member and casing and extending between said bolts, said layer being substantially ring-shaped to provide a central opening through which access may be had to said casing, and means carried by said bolts to draw said casing towards said member and to compress said layer.

CARL E. MEYERHOEFER.